Oct. 22, 1963 R. A. WOOD 3,107,853

ELECTRICAL COUNTING AND CONTROL CIRCUIT

Filed Aug. 25, 1959 3 Sheets-Sheet 1

INVENTOR.
RICHARD A. WOOD

BY Allen and Chromy

ATTORNEYS

Oct. 22, 1963 R. A. WOOD 3,107,853

ELECTRICAL COUNTING AND CONTROL CIRCUIT

Filed Aug. 25, 1959 3 Sheets-Sheet 2

INVENTOR.
RICHARD A. WOOD

BY Allen and Chromy

ATTORNEYS

ELECTRICAL COUNTING AND CONTROL CIRCUIT

Filed Aug. 25, 1959

INVENTOR.
RICHARD A. WOOD
BY Allen and Chromy
ATTORNEYS

United States Patent Office 3,107,853

Patented Oct. 22, 1963

3,107,853

ELECTRICAL COUNTING AND CONTROL CIRCUIT

Richard A. Wood, Sunnyvale, Calif., assignor, by mesne assignments, to Genevieve I. Magnuson, executrix of the estate of Roy M. Magnuson, deceased, Saratoga, Calif.

Filed Aug. 25, 1959, Ser. No. 835,994
8 Claims. (Cl. 235—98)

This invention relates to an electrical counting and control circuit.

An object of this invention is to provide an improved counting and control circuit.

Another object of this invention is to provide an improved counting and control circuit that is highly reliable in operation and may be used under adverse environmental conditions.

Still another object of this invention is to provide an improved electrical counting and control circuit that may be used in the counting of various objects, such as fruit and control the feeding of pre-determined numbers of such objects to different containers.

Other and further objects of this invention will be apparent to those skilled in the art to which it relates, from the following specification, claims and drawing.

In accordance with this invention, there is provided an electrical counting and control circuit that may be constructed as a compact unit suitable for use in cannery installations and similar installations for counting objects, such as fruit to be placed into containers. For this purpose this circuit employs a light-sensitive cell that is to be energized by means of a light beam which is interrupted by the objects to be counted and the pulses from this light-sensitive cell circuit are supplied to a gas-type discharge tube which in turn supplies pulses to a flip-flop oscillator. The outputs of the flip-flop oscillator are connected to the odd and even grid electrodes respectively of a magnetron type beam switching tube which is associated with a selector switch whereby the beam switching tube may be made responsive to a selected number of pulses. When the selected number of pulses is received by the beam switching tube, a pulse is supplied to a one-shot oscillator which is connected to a dual triode tube circuit that is employed for clearing the beam switching tube. When the beam switching tube is cleared, the beam thereof is brought to the zero position thereof in which it contacts the zero position target electrode. This action produces a pulse which is supplied to the flip-flop oscillator and causes resetting of this oscillator to its initial condition. It also supplies a pulse to an output flip-flop oscillator which is connected to a control relay. This control relay may be connected to control the feeding apparatus whereby the objects being counted are fed to a pre-determined position or container after a pre-determined number of those objects have been counted.

Figure 1:
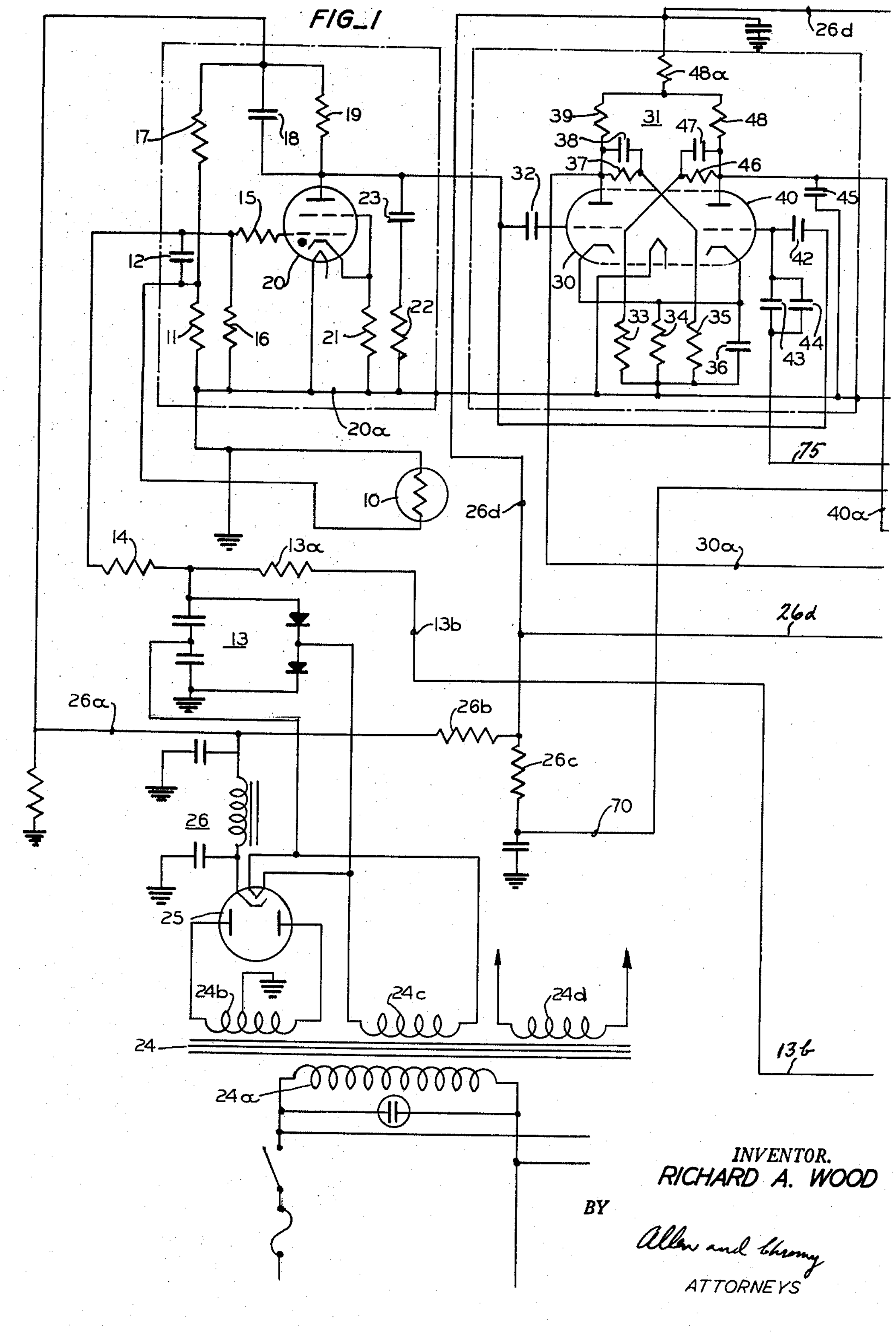
Figure 2:
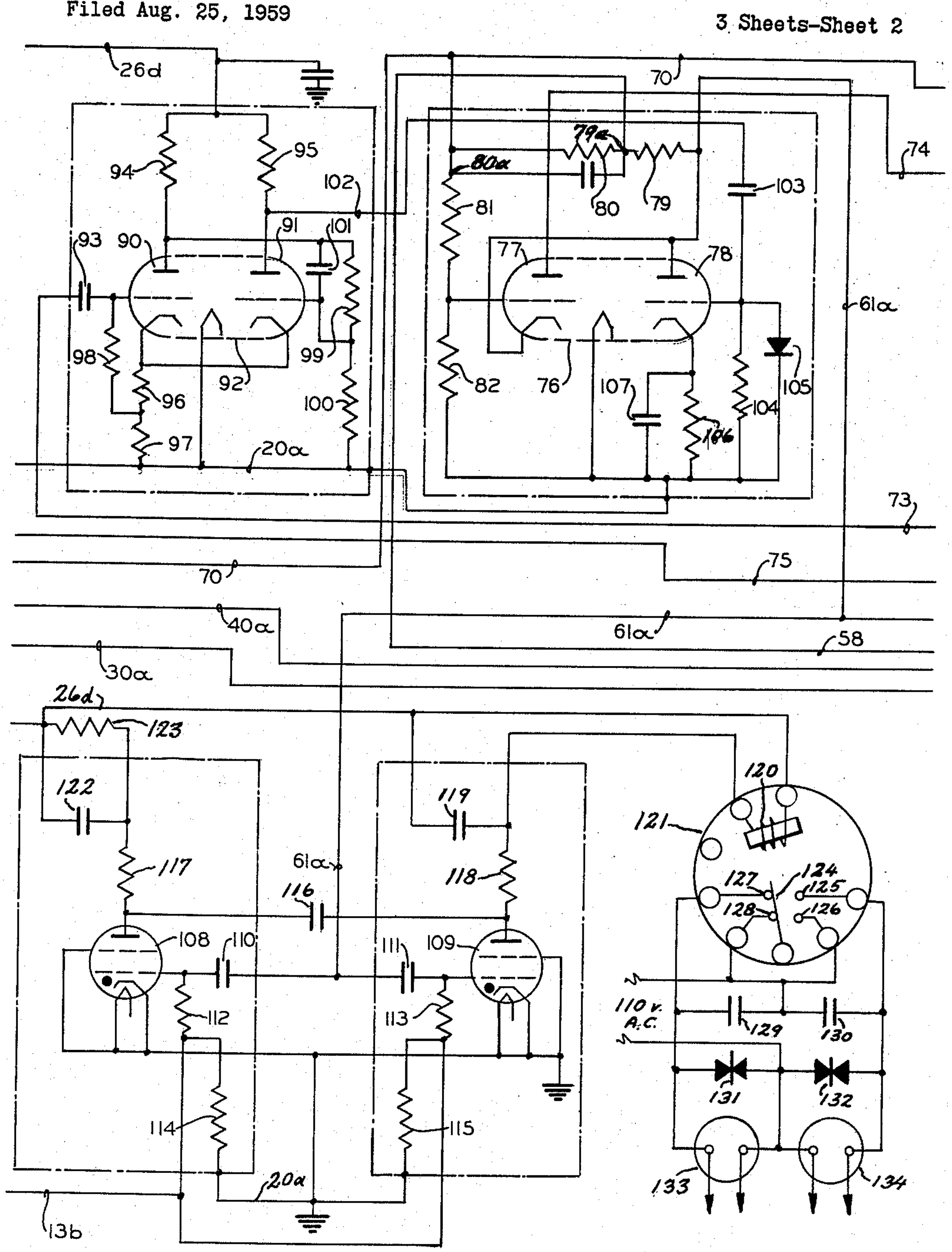
Figure 3:
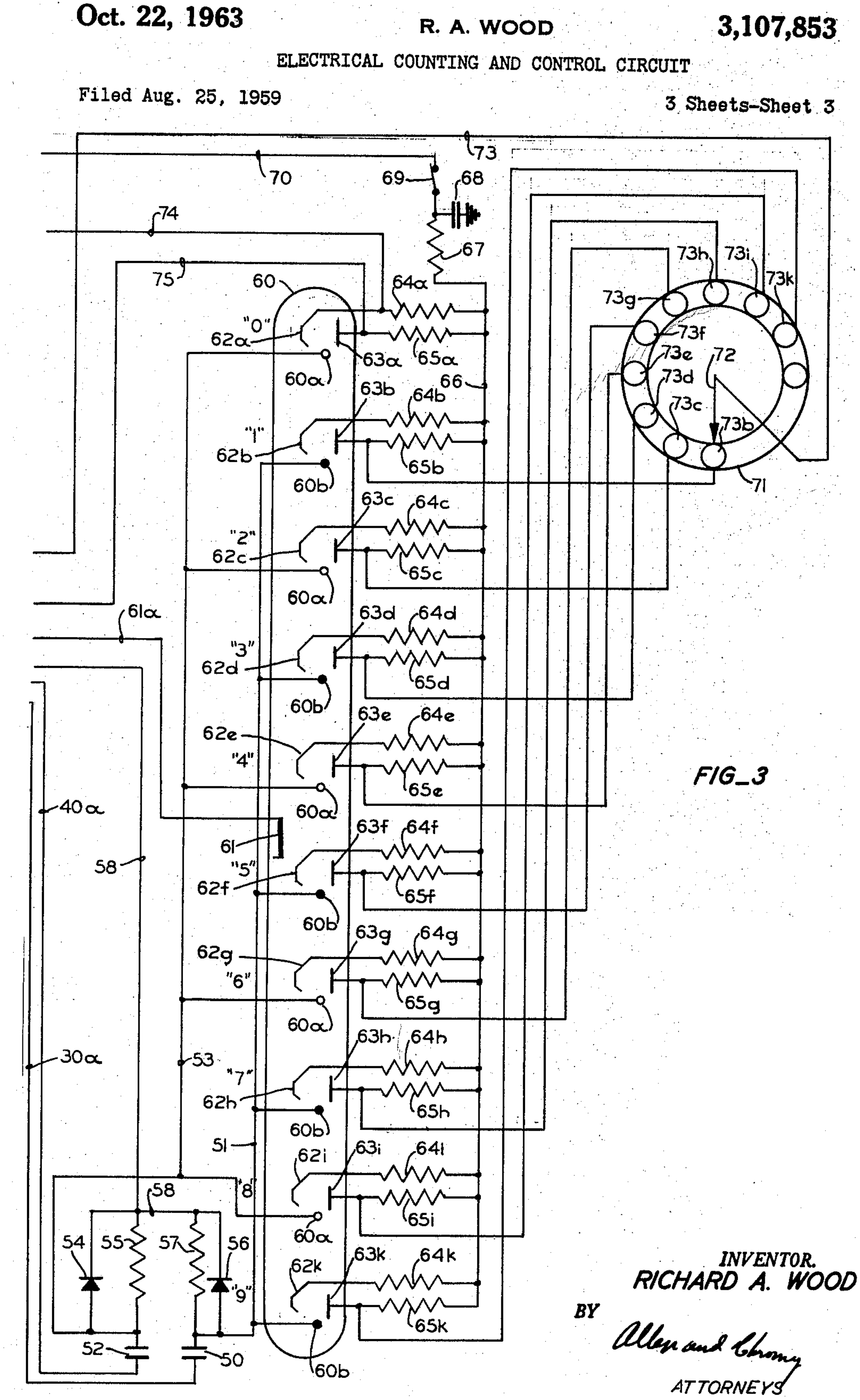

Further details of this invention will be set forth in the following specification, claims and drawing in which briefly:

FIGURES 1, 2 and 3 comprise a wiring diagram in which FIGURE 1 is the left-hand portion; FIGURE 2 is the intermediate portion and FIGURE 3 is the right-hand portion.

Referring to FIGURES 1, 2 and 3 of the drawing, there is illustrated a schematic wiring diagram of an embodiment of this invention, in which the light-sensitive cell 10 is connected across the resistor 11 of the voltage dividing network including this resistor and resistor 17. The upper terminal of this network is connected to the positive output terminal of the filter 26 provided to filter the output of the full wave recifier 25, and the lower terminal of which is grounded whereby a suitable voltage is supplied across this network from the rectifier 25. This same source of current supply is employed for thyratron or gas tetrode 20, the anode of which is connected through the resistor 19 to the positive terminal of the aforesaid supply, and the cathode of which is connected through the resistor 21 to the grounded line *20a*.

The power supply employing the rectifier tube 25 also includes a suitable transformer 24, having a primary winding *24a* that is adapted to be connected to the conventional 110 volt alternating current lighting supply. This transformer includes a high voltage secondary winding *24b* for supplying the plate currents to the various tubes, a low voltage filament supply winding *24c* for the rectifier 25 and for the voltage doubler circuit 13, and an additional filament supply winding *24d*. The winding *24c* in addition to supplying the cathode heater of the rectifier 25, also energizes the voltage doubler circuit 13, which includes a pair of diode rectifiers and a pair of capacitors connected to double the voltage supplied thereto. This supply is connected to one end of the resistor 14 the other end of which is connected through the resistor 15 to the control grid of the gas tetrode 20. The capacitor 12 is connected between the common connection of the resistors 11 and 17 and the grid resistor 15 whereby pulses obtained from the output of the light-sensitive cell 10 are applied to the control grid of the gas tetrode 20 through the coupling capacitor 12 and grid resistor 15, since this coupling capacitor is connected between the resistors 11 and 17 and the left-hand terminal of the grid resistor 15, the right-hand terminal of which is connected to the control grid electrode of the tetrode 20.

Another resistor 16 is connected between the left-hand terminal of the resistor 15 and the grounded line *20a*. The cathode and auxiliary grid electrode of the tube 20 are connected to the upper terminal of the resistor 21, the lower terminal of which is connected to the line *20a*. The anode of the tube 20 is connected to the lower terminal of the plate resistor 19 through which the plate current is supplied to the tube 20. The resistor 19 is shunted by the capacitor 18. The upper terminal of the capacitor 23 is connected to the anode of the tube 20 and the lower terminal of this capacitor is connected to the resistor 22, the lower terminal of which is connected to the line *20a*.

The anode of the tube 20 is coupled to the control grids of the triode sections 30 and 40 of the dual triode tube connected as the flip-flop oscillator 31, by the capacitors 32 and 42 respectively, so that pulses are supplied to the grids of the flip-flop oscillator from the anode circuit of the tube 20, as objects being counted are passed by the light-sensitive cell 10.

The cathodes of the triode sections 30 and 40 are connected together to the upper terminals of the resistor 34 and capacitor 36, the lower terminals which are connected to the grounded line *20a*. The lower terminals of the resistors 33 and 35 are also connected to the grounded line *20a* and the upper terminals of these resistors are connected to the left-hand side and right-hand side respectively of the resistors 46 and 37, the other sides of which are connected to the respective anodes of the triodes sections 30 and 40. The resistors 37 and 46 are shunted by the capacitors 38 and 47 respectively. The lower terminals of the plate resistors 39 and 48 are connected to the anodes of the sections 30 and 40 respectively, and the upper terminals of these resistors are connected together to the lower terminal of the resistor *48a*; the upper terminal of which is connected to the positive terminal of the filter 26 through which plate current is supplied to the triodes 30 and 40 of the flip-flop oscillator.

Output pulses from the flip-flop oscillator are supplied on the lines 30*a* and 40*a* which are connected to the anodes of the triode sections 30 and 40 respectively, and these output lines are connected to the coupling capacitors 50 and 52 respectively which are connected to the odd grids 60*b* and even grids 60*a* of the tube 60, by means of the lines 51 and 53 respectively, as is shown in FIGURE 3. The tube 60 may be a type 6700 magnetron beam switching tube manufactured by the Burroughs Corporation.

The even grids of the tube 60 are connected together to the line 53 and this line is connected by the parallel circuit comprising the diode 54 and the resistor 55 to the line 58, which is connected to the point 79*a* of the voltage divider resistor network including the resistors 79, 80, 81 and 82 connected in series (FIGURE 2) and from which the bias potential for the grids of the tube 60 is derived. Likewise the odd grids 60*b* are connected together to the line 51, which is connected by the parallel circuit comprising the diode 56 and the resistor 57 to the line 58. The diode 54 shunted across the resistor 55 and the similar diode 56 shunted across the resistor 57 are connected so that the anodes thereof are connected to the capacitors 52 and 50, respectively. The cathode 61 of the tube 60 is connected by the line 61*a* to one side of the aforesaid resistor network including the resistors 79, 80, 81 and 82, and this side of this network is also connected to the anode of the triode section 78 and to the cathode of the triode section 77 of the dual triode 76, whereby the cathode 61 is at a lower potential than the grids 60*a* and 60*b* since the intermediate point 80*a* of this network is connected by the line 70 to the positive terminal of the plate current supply through suitable voltage dropping resistors 26*b* and 26*c* as shown in FIGURE 1.

The switching tube 60 is constructed so that the beam thereof may be formed at any of ten positions designated by the legends 0, 1, 2, 3, 4, 5, 6, 7, 8 and 9. Each of these positions includes a grid, a spade electrode, and a target. Thus the "0" position includes a grid 60*a*, spade electrode 62*a*, and target electrode 63*a*; the "1" position includes a grid 60*b*, a spade electrode 62*b*, and a target 63*b*; the "2" position includes a grid electrode 60*a*, a spade electrode 62*c*, and a target electrode 63*c*; the "3" position includes a grid electrode 60*b*, a spade electrode 62*d*, and a target electrode 63*d*; the "4" position includes a grid electrode 60*a*, a spade electrode 62*e*, and a target electrode 63*e*; the "5" position includes a grid electrode 60*b*, a spade electrode 62*f*, and a target electrode 63*f*; the "6" position includes a grid electrode 60*a*, a spade electrode 62*g*, and a target electrode 63*g*; the "7" position includes a grid electrode 60*b*, a spade electrode 62*h*, and a target electrode 63*h*; the "8" position includes a grid electrode 60*a*, a spade electrode 62*i*, and a target electrode 63*i*, and the "9" position includes a grid electrode 60*b*, a spade electrode 62*k*, and a target electrode 63*k*. These electrodes are all arranged radially around the centrally disposed cathode 61, and the entire electrode array is positioned in an evacuated envelope which is surrounded by a tubular permanent magnet that provides a mganetic field of the desired intensity therethrough.

The target electrode 63*a* of the "0" position is connected by means of the line 75 to the bottom terminals of the coupling capacitors 43 and 44, (FIGURE 1), the upper terminals of which are connected to the grid of the triode section 40 of the flip-flop oscillator 31 for the purpose of providing a reset pulse to this flip-flop. The spade electrode 62*a* of the "0" position is connected by means of the line 74 to the anode of the triode section 77 of the dual triode 76 (FIGURE 2).

The target electrodes 63*b* to 63*k* are connected to the terminals 73*b* to 73*k* respectively of the count selector switch 71 which is provided with a variable contactor 72 for the purpose of connecting different selected target electrodes to the line 73 and when the beam of the tube 60 is shifted to the selected target electrode a pulse is supplied on the line 73. The line 73 is coupled by the capacitor 93 to the grid of the triode section 90 of the dual triode 92 which is connected as a one-shot oscillator to provide sharp square pulses from the output pulses of the tube 60.

The spade electrodes 62*a* to 62*k* inclusive are connected through the resistors 64*a* to 64*k* inclusive respectively to the positive line 66 and the target electrodes 63*a* to 63*k* inclusive are connected to this same line through the resistors 65*a* to 65*k* inclusive respectively. This line 66 in connected through the resistor 67 and the push-button switch 69 to the line 70 which is connected to the positive output of the rectifier shown in FIGURE 1.

The one-shot oscillator which receives the output pulses from the beam switching tube 60 over the line 73 comprises a dual triode tube 92, having triode sections 90 and 91, the anodes of which are connected to the lower terminals of the resistors 94 and 95 respectively, the upper terminals of which are connected together to the positive supply line 26*d*. The cathodes of the triode sections 90 and 91 are connected together to the upper terminal of the resistor 96, the lower terminal of which is connected to the upper terminal of the resistor 97 and also to the lower terminal of the resistor 98. The upper terminal of the resistor 98 is connected to the grid of the triode section 90 and functions as the grid resistor, and the lower terminal of the resistor 97 is connected to the grounded line 20*a*. The anode of the triode section 90 is also connected to the upper terminals of the resistor 99 and the capacitor 101, the lower terminals of which are connected together to the grid of the triode section 91 and also to the upper terminal of the resistor 100, the lower terminal of which is connected to the grounded line 20*a*. The anode of the triode section 91 is connected by the line 102 to the coupling capacitor 103, and thus to the grid of the triode section 78 of the dual triode 76 so that sharp square negative voltage pulses are supplied over the line 102 to the grid of the triode section 78 which is normally conducting. The grid of this section is also connected to the upper terminal of the resistor 104 and to the anode of the diode 105 which is shunted across the resistor 104. The lower terminals of resistor 104, resistor 106, and capacitor 107 are all connected to the grounded line 20*a* and the upper terminals of the resistor 106 and capacitor 107 are connected to the cathode of the triode section 78. The cathode of the triode section 77 is connected to the anode of the triode section 78 and to the cathode line 61*a* which goes to the cathode of the tube 60. The anode of the triode section 77 is connected by the line 74 to the spade electrode 62*a* of the tube 60 and it will be noted that the triode section 77 is connected across the "0" position of the switching tube 60.

The cathode line 61*a* is also connected to the grid electrodes of the gas tetrodes 108 and 109 through the coupling capacitors 110 and 111 respectively to supply pulses to these gas tetrodes which are connected as a flip-flop oscillator. The control grids of these gas tetrodes 108 and 109 are connected through the grid resistors 112—114 and 113—115 to the grounded line 20*a* and through the resistors 112 and 113, respectively to the grid bias supply line 13*b*.

A capacitor 116 is connected between the anodes of the gas discharge tubes 108 and 109 whereby a negative pulse is transmitted from the one of these tubes upon initiation of conduction thereof to the anode of the other of these tubes to quench the latter. The lower terminal of resistor 117 is connected to the anode of the tube 108 and the upper terminal thereof is connected to the resistor 123 and to one side of the capacitor 122. The other side of the resistor 123 and the other side of the capacitor 122 are connected together to the line 26*d* which supplies the anode current to the tube 108 through the resistors 123 and 117. The tube 109 has the anode thereof connected to the lower terminal of the resistor 118 and the upper terminal of this resistor is connected to one side of the capacitor 119 and to one terminal of the solenoid 120 of the relay 121. The other terminal of this solenoid is connected to the line 26*d* and to the other side of the capacitor 119, so that the tube 109 receives its plate current through solenoid 120 and the resistor 118 whereby the solenoid 120 is energized when the tube 109 is fired. The solenoid 120 of the relay 121 controls the movable armature 124 thereof which is arranged to close the circuit of the contacts 125 and 126 on the one hand and the contacts 127 and 128 on the other. The contacts 126 and 128 are connected together and to the common connection between the capacitors 129 and 130 and from these to one side of the 110 volt alternating current supply. Contact 125 is connected to the outer terminal of the capacitor 130 and to one of the anodes of the double diode 132, the cathodes of which are connected together so that each of the diodes functions as a type of zener diode protective device in case a high voltage is developed in the winding of the solenoid valve (not shown) connected to the connector 133. The contact 125 is also connected to one of the terminals of the connector 134. Likewise the contact 127 is connected to the outer terminal of the capacitor 129 and to one of the anodes of the double diode 131, the cathodes of which are connected together and to one of the terminals of the connector 133. The function of the double diode 131 is the same as that of double diode 132. The other anodes of the double diodes 131 and 132 are connected together and to the other side of the 110 volt alternating current supply, which is also connected to the common connection between the terminals of the connectors 133 and 134. The connectors 133 and 134 are provided for making connection to the solenoids of a pair of air valves (not shown) which are provided for controlling the air streams that are provided for deflecting the objects being counted after said objects pass the light-sensitive cell 10. This arrangement is similar to that shown in Patent No. 2,870,585 issued January 27, 1959.

The operation of this circuit is as follows:

The objects being counted (not shown) are moved by the light-sensitive cell 10 and interrupt the light beam passing thereto, thus producing voltage pulses in the output circuit of this cell. These pulses are applied to the grid circuit of the gas tetrode 20 through the capacitor 12 and function to trigger this tube which is normally biased negative by a voltage supplied by the rectifier and filter circuit 13. The output pulses from the tube 20 are applied to the grid electrodes of the dual triode tube sections 30 and 40, which are connected as a flip-flop oscillator. Initially the section 40 is set to be conductive so that when a pulse is supplied from the tube 20 the triode section 30 becomes conductive and the triode section 40 non-conductive. The anode of the triode section 30 is connected to the odd grids 60*b* of the beam switching tube 60 by the line 30*a* and the coupling capacitor 50 and the anode of the triode section 40 is connected to the even grids 60*a* of the beam switching tube 60 by the line 40*a* and the coupling capacitor 52. Consequently rendering the triode section 30 conductive provides a pulse to the odd grids and causes the beam of the beam switching tube 60 to advance to its "1" position. The next pulse supplied by the tube 20 to the flip-flop tube sections 30—40 renders the section 40 conductive and the section 30 non-conductive whereby a pulse is supplied to the even grids of the beam switching tube 60, thereby causing the beam thereof to shift from its "1" position to its "2" position.

The target electrodes 63*b*–63*k* of the beam switching tube 60 are connected to terminals 73*b*–73*k* respectively of the selector switch 71 which is provided with a selector arm 72 that may be rotated to engage any one of the contacts thereof. Thus any pre-determined count between for example, 1 and 9, may be selected by adjusting this rotatable selector arm to the desired contact thereof. Thus if the count of five is desired to be selected, the rotatable selector arm of this selector switch is placed in contact with the contact 73*f* thereof which is connected to the target electrode 63*f* of the tube 60, and as pulses are supplied to the even and odd grids of the tube 60 from the flip-flop circuit 31 the beam of the tube 60 is shifted from one position to another until it reaches the target electrode 63*f* selected by the rotatable arm of the selector switch 71. When the selected target electrode, that is, electrode 63*f*, is reached by the beam a pulse is supplied over the circuit of the selector switch 71, that is, the connecting line 73, to the control grid of the triode section 90 of the dual triode 92. The dual triode 92 is connected as a one-shot oscillator and functions to produce substantially square negative voltage pulses from pulses of irregular shape supplied thereto by the beam switching tube. The sharp square pulse output of the one-shot oscillator is supplied to the line 102 which is coupled to the control grid of the triode section 78 of the dual triode tube 76 by the capacitor 103. The tube 76 is provided with triode sections 77 and 78 which are connected in series, that is, the anode of section 78 is connected to the cathode of section 77. The cathode of section 78 is connected to ground through a suitable resistor and the anode of this triode section is connected to the cathode of section 77 and to the cathode of the switching tube 60 by the line 61*a*. Thus the current flowing through the beam switching tube 60 also flows through the triode section 78 and this section is therefore normally conducting while the section 77 is normally non-conducting. When a negative pulse is supplied to the grid of the triode section 78 so as to reduce the conductivity of this section the potential of the cathode 61 of the beam switching tube 60 goes up and a positive pulse is supplied on line 61*a* to the control grid electrodes of the gas tetrodes 108 and 109 which are connected as a flip-flop oscillator.

The beam switching tube 60 is reset at this time, that is, the beam thereof is reset to the "0" position because the potential of the spade electrode 62*a* at the "0" position is reduced through the change in voltage levels on electrodes of the dual triode 76 whereby the triode section 77 is caused to conduct current through the resistor 64*a* connected to the spade 62*a* of the "0" position. The tube 60 may also be cleared and reset by opening the push button switch 69 if desired.

The positive pulse supplied to the control grid electrodes of the gas tetrodes 108 and 109 triggers the non-conductive one of these tubes into its conductive condition with the result that the previously conductive tube is quenched by a negative pulse supplied to its anode through the capacitor 116 from the anode of the tube triggered into conductivity.

For example, if the tube 108 is conducting at the time that a positive pulse is supplied to the control grids of the tubes 108 and 109 over the line 61*a*, then this pulse will render the tube 109 conducting with the result that a negative pulse will be supplied from the anode of the tube 109 to the anode of the tube 108 through the capacitor 116, and this pulse is of sufficient magnitude to quench the tube 108. The plate current of the tube 109 passes through the resistor 118 and through the solenoid 120 of the relay 121 from the line 26*d* and this current energizes the solenoid 120 causing it to shift the contactor 124 thereof from the contacts 127—128 to the contacts 125—126 thereby closing the circuit of these latter contacts. Alternating current is thus supplied through the contacts 125—126 and the associated connections to the terminal block 134 thereby energizing the solenoid valve connected to this terminal block and at the same time the circuit of the contacts 127—128 is interrupted so that the alternating current supply is removed from the terminal block 133 and the solenoid valve associated (not shown) therewith is de-energized.

When the next positive pulse is received over the line 61*a* from the beam switching tube 60, the tube 108 is triggered into conductivity wtih the result that a negative pulse is supplied through the capacitor 116 to the anode of the tube 109 and this latter tube is quenched. The tube 108 is rendered conductive and draws its plate current through the resistor 117 and resistor 123 which are connected in series therewith. However, reducing the conductivity of the tube 109 interrupts the current through the solenoid 120 and as the result the contactor 124 thereof is shifted to close the contacts 125—126 by means of a suitable spring (not shown) so that during the interval until the next positive pulse is received over the line 61a, the contactor of the relay 121 is in contact with the terminals 125—126 and the solenoid valve (not shown) connected to the terminal block 133 is energized.

When the beam of the beam switching tube 60 is reset to its "0" position it impinges the target electrode 63a and a pulse is produced which is applied to the line 75, that is connected to the lower terminals of the capacitors 43 and 44, the upper terminals of which are connected to the control grid of the triode section 40 of the flip-flop oscillator 31. This pulse functions to reset flip-flop oscillator 31 so that the triode section 40 is conducting at the beginning of the next cycle of operation. This is necessary so that the first pulse from the next series of objects passing the light-sensitive cell 10 will trigger the flip-flop triode sections 30 and 40 in the right sequence.

The capacitors 43 and 44 are preferably of very small magnitudes so as to prevent the relative high potential of the target electrode 63a from rendering the flip-flop section 40 unstable. In other words, these capacitors need be only of sufficient capacity to pass a pulse to the triode section 40 sufficient to reset this section and leave it in conductive condition at the end of a cycle.

The capacitor 45 which is connected between the anode of the flip-flop triode section 40 and the grounded line 20a is also of small magnitude. This capacitor is employed to increase the stability of operation of the flip-flop 31.

While I have described an embodiment of this invention in detail it is not desired to limit this invention to the details set forth except insofar as they are defined by the following claims.

What I claim is:

1. An electronic device for controlling the operation of object feeding apparatus comprising an input circuit adapted to produce an electrical pulse corresponding to each object, a flip-flop oscillator, means for supplying pulses from said input circuit to said flip-flop oscillator, a beam switching tube, means for connecting said beam switching tube to said flip-flop oscillator whereby the beam of said tube is stepped over the target array thereof in response to pulses supplied thereto by said flip-flop oscillator, means for setting said beam switching tube to control the response thereof to a selected number of pulses supplied thereto from said flip-flop oscillator, said selected number of pulses corresponding to the number of objects to be fed to a given position, an output flip-flop oscillator connected to said beam switching tube, means connected to said beam switching tube for supplying a pulse to said output flip-flop oscillator when said selected number of pulses is supplied to said beam switching tube, and an electro-mechanical control apparatus connected to the output circuits of said output flip-flop oscillator to control the feeding of the objects to selected positions.

2. An electronic device for controlling the operation of object feeding apparatus comprising an input circuit adapted to produce an electrical pulse corresponding to each object, a flip-flop oscillator, means for supplying pulses from said input circuit to said flip-flop oscillator, a beam switching tube, means for connecting said beam switching tube to said flip-flop oscillator whereby the beam of said tube is stepped over the target array thereof in response to pulses supplied thereto by said flip-flop oscillator, means for setting said beam switching tube to respond to a selected number of pulses supplied thereto from said flip-flop oscillator in a given cycle of operation, said selected number of pulses corresponding to the number of objects to be fed to a given position, means connected between said beam switching tube and said flip-flop oscillator for resetting said flip-flop oscillator at the end of each cycle of operation, an output flip-flop oscillator connected to said beam switching tube, means connected to said beam switching tube for supplying a pulse to said output flip-flop oscillator when said selected number of pulses is supplied to said beam switching tube, and an electro-mechanical control apparatus connected to the output circuits of said output flip-flop oscillator to control the feeding of the objects to selected positions.

3. An electronic device for controlling the operation of object feeding apparatus comprising an input circuit adapted to produce an electrical pulse corresponding to each object, a flip-flop oscillator, means for supplying pulses from said input circuit to said flip-flop oscillator, a beam switching tube, means for connecting said beam switching tube to said flip-flop oscillator whereby the beam of said tube is stepped over the target array thereof in response to pulses supplied thereto by said flip-flop oscillator, means for setting said beam switching tube to respond to a selected number of pulses supplied thereto from said flip-flop oscillator in a given cycle of operation, said selected number of pulses corresponding to the number of objects to be fed to a given position, an output flip-flop oscillator comprising a pair of gas discharge tubes each having a control electrode and means connected to said beam switching tube whereby a pulse is supplied to the control electrodes of said gas discharge tubes when said selected number of pulses is supplied to said beam switching tube, and an electro-mechanical control apparatus connected to the output circuits of said output flip-flop oscillator to control the feeding of the objects to selected positions.

4. An electronic device for controlling the operation of object feeding apparatus comprising an input circuit adapted to produce an electrical pulse corresponding to each object, a flip-flop oscillator, means for supplying pulses from said input circuit to said flip-flop oscillator, a beam switching tube having a plurality of target electrodes corresponding to positions designated from "0" to "9," means for connecting said beam switching tube to said flip-flop oscillator whereby the beam of said tube is stepped over the target array thereof in response to pulses supplied thereto by said flip-flop oscillator, a selector switch having selected contacts thereof connected to selected ones of said target electrodes for conditioning said beam switching tube to respond to a selected number of pulses supplied thereto from said flip-flop oscillator in a given cycle of operation, said selected number of pulses corresponding to the number of objects to be fed to a given position, an output flip-flop oscillator connected to said selector switch whereby a pulse is supplied to said output flip-flop oscillator when said selected number of pulses is supplied to said beam switching tube, and an electro-mechanical control apparatus connected to the output circuits of said output flip-flop oscillator to control the feeding of the objects to selected positions.

5. An electronic device for counting and controlling the number of objects to be placed into a given position during a cycle of operation, comprising an input circuit adapted to produce an electrical pulse corresponding to each object to be counted, a flip-flop oscillator, means for supplying pulses from said input circuit to said flip-flop oscillator, a beam switching tube, means for supplying pulses from said flip-flop oscillator to said beam switching tube, means for setting said beam switching tube to receive a pre-determined number of said pulses from said flip-flop oscillator during a cycle of operation, a one-shot oscillator connected to said beam switching tube to receive a pulse therefrom in each cycle of operation to produce a substantially square output pulse, means responsive to said substantially square pulse for clearing said beam switching tube connected between said one-shot oscillator and said beam switching tube, an output flip-flop oscillator, and means for supplying a pulse to said output flip-flop oscillator when said beam switching tube is cleared and a relay connected to said flip-flop oscillator for controlling the feed of the object being counted to a given position.

6. An electronic device for counting and controlling the number of objects to be placed into a given position during a cycle of operation, comprising an input circuit adapted to produce an electrical pulse corresponding to each object to be counted, a flip-flop oscillator, means for supplying pulses from said input circuit to said flip-flop oscillator, a beam switching tube having a plurality of target electrodes corresponding to positions designated from "0" to "9," means for supplying pulses from said flip-flop oscillator to said beam switching tube, settable means connected to said target electrodes for conditioning said beam switching tube to receive a pre-determined number of said pulses from said flip-flop oscillator during a cycle of operation, a one-shot oscillator connected to said beam switching tube to receive a pulse therefrom in each cycle of operation to produce a substantially square output pulse, means responsive to said substantially square pulse for clearing said beam switching tube connected between said one-shot oscillator and said beam switching tube, an output flip-flop oscillator, and means connected to said settable means for supplying a pulse to said output flip-flop oscillator when said pre-determined number of pulses is supplied to said beam switching tube and means for supplying a pulse to reset said first mentioned flip-flop oscillator when said beam switching tube is cleared and a relay connected to said flip-flop oscillator for controlling the feeding of the objects being counted to a given position.

7. An electronic device comprising an input circuit adapted to produce an electrical pulse corresponding to selected objects, a flip-flop oscillator, means for supplying pulses from said input circuit to said flip-flop oscillator, a beam switching tube, means for supplying pulses from said flip-flop oscillator to said beam switching tube, means for conditioning said beam switching tube to receive a predetermined number of said pulses from said flip-flop oscillator during a cycle of operation, a one-shot oscillator connected to said beam switching tube to receive a pulse therefrom in each cycle of operation to produce a substantially square output pulse, means responsive to said substantially square pulse for clearing said beam switching tube connected between said one-shot oscillator and said beam switching tube, an output flip-flop oscillator comprising a pair of gas discharge tubes, means for supplying a pulse to said output flip-flop oscillator and a pulse to reset said first mentioned flip-flop oscillator when said pre-determined number of pulses is supplied to said beam switching tube and a relay connected in series with one of said gas discharge tubes of said flip-flop oscillator for controlling an external circuit.

8. An electronic device comprising an input circuit adapted to produce an electrical pulse corresponding to selected objects, a flip-flop oscillator, means for supplying pulses from said input circuit to said flip-flop oscillator, a beam switching tube, means for supplying pulses from said flip-flop oscillator to said beam switching tube, means for setting said beam switching tube to receive a pre-determined number of said pulses from said flip-flop oscillator during a cycle of operation, a one-shot oscillator connected to said beam switching tube to receive a pulse therefrom in each cycle of operation to produce a substantially square output pulse, means responsive to said substantially square pulse for clearing said beam switching tube connected between said one-shot oscillator and said beam switching tube, an output flip-flop oscillator, means for supplying a pulse to said output flip-flop oscillator when said pre-determined number of pulses is supplied to said beam switching tube, means for resetting said first mentioned flip-flop oscillator when said beam switching tube is cleared, and a relay connected to said flip-flop oscillator for controlling an external circuit.

References Cited in the file of this patent

UNITED STATES PATENTS

| | | |
|---|---|---|
| 2,087,039 | McMaster | July 13, 1937 |
| 2,523,517 | Potter | Sept. 28, 1950 |
| 2,760,315 | Wilckens et al. | Aug. 28, 1956 |
| 2,827,167 | Joseph et al. | Mar. 18, 1958 |
| 2,870,585 | Cowan | Jan. 27, 1959 |
| 2,871,399 | Scuitto | Jan. 27, 1959 |
| 2,922,576 | Winfield | Jan. 26, 1960 |